US010260530B2

(12) United States Patent
Gass et al.

(10) Patent No.: US 10,260,530 B2
(45) Date of Patent: Apr. 16, 2019

(54) ASPIRATOR AND METHOD OF FABRICATING

(71) Applicant: CIRCOR AEROSPACE, INC., Hauppauge, NY (US)

(72) Inventors: David W. Gass, Wading River, NY (US); Robert S. Seibert, Manorville, NY (US); Brian J. Hickey, Centereach, NY (US); Christopher R. Lovasco, Shoreham, NY (US); Russell S. Sirvis, East Setauket, NY (US); Robert Charles Lenardi, Kings Park, NY (US)

(73) Assignee: CIRCOR AEROSPACE, INC., Hauppauge, NY (US)

( * ) Notice: Subject to any disclaimer, the term of this patent is extended or adjusted under 35 U.S.C. 154(b) by 333 days.

(21) Appl. No.: 14/873,250

(22) Filed: Oct. 2, 2015

(65) Prior Publication Data
US 2016/0102682 A1  Apr. 14, 2016

Related U.S. Application Data

(60) Provisional application No. 62/062,352, filed on Oct. 10, 2014.

(51) Int. Cl.
| *F04F 5/18* | (2006.01) |
| *F04F 5/46* | (2006.01) |
| *B22F 3/105* | (2006.01) |
| *F04F 5/20* | (2006.01) |

(Continued)

(52) U.S. Cl.
CPC .............. *F04F 5/18* (2013.01); *B22F 3/1055* (2013.01); *B22F 5/106* (2013.01); *B22F 7/06* (2013.01);
(Continued)

(58) Field of Classification Search
CPC ........ F04F 5/14; F04F 5/16; F04F 5/46; F04F 5/466; F04F 5/54
USPC .................................................. 417/170, 191
See application file for complete search history.

(56) References Cited

U.S. PATENT DOCUMENTS

| 708,200 A * | 9/1902 | Bushnell ................. F04F 5/466 15/409 |
| 2,111,266 A * | 3/1938 | Hopkins ................. F24F 13/26 417/179 |

(Continued)

*Primary Examiner* — Charles G Freay
(74) *Attorney, Agent, or Firm* — McNees Wallace & Nurick LLC

(57) ABSTRACT

An aspirator with an aspirator body and an exhaust port coupled to the body, and having a plurality of integral high pressure gas nozzles positioned along the aspirator body the body. The aspirator body includes a high pressure integral conduit in communication with a nozzle array having a plurality of high pressure gas nozzles. The nozzles are arcuate, extending away from the body toward an aspirator centerline, the nozzles extending from the aspirator body at a preselected angle toward the centerline in a direction from an atmospheric air aspiration port toward the exhaust port. A high pressure inlet port integral with the body is in communication with the conduit and a high pressure gas source. The gas may be input into the inlet port using a high pressure inlet fitting, which may be threaded onto the inlet port outside the aspirator body. The aspirator is fabricated by additive manufacturing techniques.

23 Claims, 8 Drawing Sheets

(51) Int. Cl.
*B22F 5/10* (2006.01)
*B22F 7/06* (2006.01)
*B33Y 80/00* (2015.01)
*B33Y 10/00* (2015.01)

(52) U.S. Cl.
CPC .............. *B33Y 10/00* (2014.12); *B33Y 80/00* (2014.12); *F04F 5/20* (2013.01); *F04F 5/466* (2013.01); *F05B 2230/31* (2013.01); *F05B 2230/60* (2013.01); *F05B 2260/601* (2013.01); *Y02P 10/295* (2015.11)

(56) References Cited

U.S. PATENT DOCUMENTS

| | | | | |
|---|---|---|---|---|
| 3,188,009 | A * | 6/1965 | Miscovich | A62C 31/03 137/211 |
| 3,460,747 | A * | 8/1969 | Forsythe | F04F 5/466 137/223 |
| 3,468,472 | A * | 9/1969 | Hahn | F04F 5/461 137/223 |
| 3,554,450 | A * | 1/1971 | D'Muhala | B05B 7/2454 239/309 |
| 3,606,586 | A * | 9/1971 | Piet et al. | F04F 5/466 137/895 |
| 4,400,138 | A * | 8/1983 | Baer | B01F 5/0471 29/450 |
| 4,815,942 | A * | 3/1989 | Alperin | F04F 5/467 417/163 |
| 5,173,030 | A * | 12/1992 | Heimhard | F04F 5/466 417/163 |
| 5,417,550 | A * | 5/1995 | Kasai | C02F 7/00 366/173.1 |
| 2010/0266424 | A1* | 10/2010 | Renz | F04F 5/463 417/191 |

\* cited by examiner

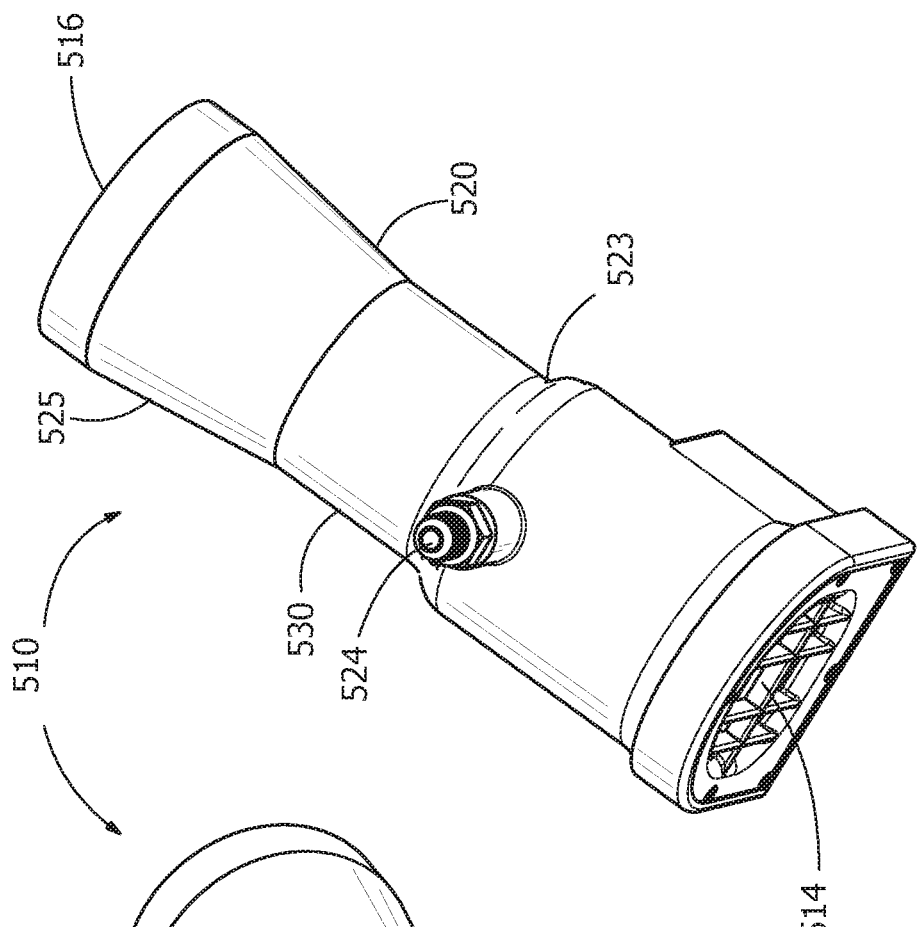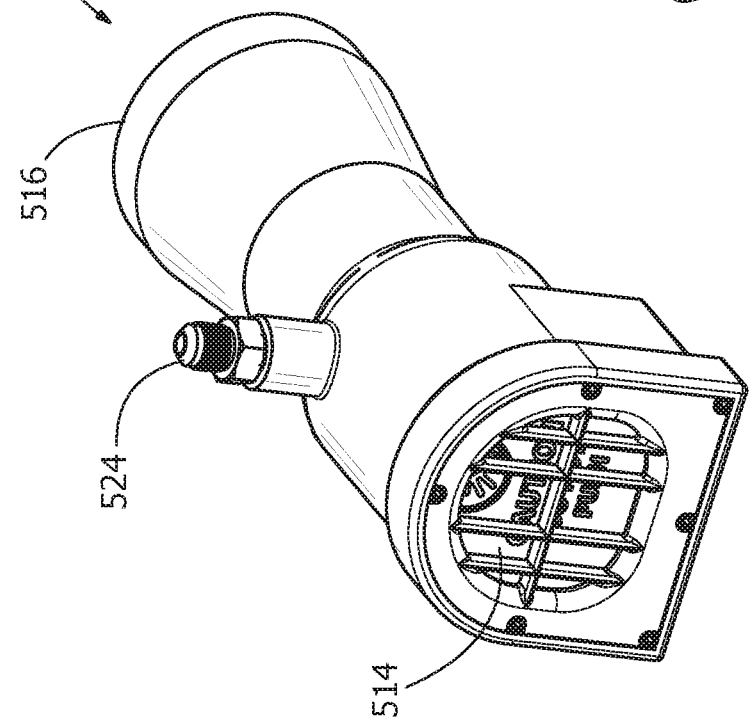

ASPIRATOR AND METHOD OF FABRICATING

FIELD OF THE INVENTION

The present invention is directed to aspirators, and more particularly to aspirators used to inflate inflatable devices such as aircraft emergency slides, life rafts and other inflatable devices and methods of fabricating such aspirators.

BACKGROUND OF THE INVENTION

Aspirators are used for inflating emergency devices such as aircraft emergency slides and life rafts as well as simple floatation devices. These devices are quickly inflated with aspirators utilizing the Venturi effect with a pressurized gas, usually air, to quickly inflate a device.

An aspirator is a type of ejector-jet pump that produces a vacuum by means of the Venturi effect. The fluid, a compressed gas, flows through a tube which then narrows. When the tube narrows, the fluid's speed increases, and because of the Venturi effect, its pressure decreases. The velocity energy creates a low pressure zone that can draw in and entrain a suction fluid, which may be air at atmospheric pressure. After passing through the throat of the aspirator, the mixed fluid expands and the velocity is reduced, which results in recompressing the mixed compressed gas and atmospheric air into pressure energy. The compression ratio of the aspirator is the ratio of the aspirator's outlet pressure $P_2$ to the inlet pressure of the suction fluid $P_1$, that is, $P_2/P_1$, while the entrainment ratio of the aspirator is the amount of the motive fluid $W_s$ required to entrain and compress a given amount $W_v$ of suction fluid, that is, $W_s/W_v$. The compression ratio and entrainment ratio are key parameters in aspirator design. FIG. 1 depicts the general principles of an aspirator 10, both of this invention and of the prior art. High pressure gas, maintained within a pressurized container, is injected into aspirator 10 through high pressure inlet fitting 12. The high pressure gas entering into aspirator 10 passes through the converging portion and diverging portion of aspirator 10, creating a pressure drop behind the high pressure gas injectors. The decreased gas pressure draws gas into the atmospheric air aspiration port 14. The atmospheric air mixes with the compressed gas within the body of aspirator 10, the mixed gas and air being expelled from exhaust port 16 of aspirator 10. Exhaust port 16 is positioned within the inflatable device.

The construction of current aspirators is complicated, making the aspirators expensive. The construction also results in physical limitations that affect airflow through the aspirator. FIGS. 2-4 depict a prior art aspirator and its construction. As can be seen in FIG. 2, prior art aspirator 210 comprises an aspirator body 220. High pressure inlet fitting 212, which may be stainless steel, is threaded into aspirator body 220 adjacent to aspiration port 214 and opposite exhaust port 216. Compressed gas, typically air or $CO_2$ injected into aspirator body 220 through high pressure inlet fitting 212 draws atmospheric air into aspirator body 220 through aspiration port 214 where it is mixed before being expelled through exhaust port 216. A plastic black coating is also shown over the surface of aspirator body 220 at and adjacent to exhaust port 216, but does not enter into operation of the aspirator.

FIG. 3 is a view of prior art aspirator along its longitudinal axis from atmospheric air aspiration port 214. A high pressure gas distributor 222 is positioned along the longitudinal axis of aspirator 210. High pressure gas distributor 222 comprises a high pressure inlet port 224 extending through a wall of body 220 to provide fluid communication to the interior of aspirator body 220. High pressure inlet port 224 is attached to high pressure gas distributor conduit 226 having a nozzle array 228 which distributes compressed gas by discharging it toward the converging/diverging nozzle portion in aspirator body 220 and parallel to the longitudinal axis of aspirator body 220. It should be noted that gas from high pressure inlet fitting 212 entering aspirator body 220 perpendicular to longitudinal axis turns 90° within high pressure gas distributor 222 so that it may exit the nozzle array 228 parallel to the longitudinal axis of body 220.

The nozzle array 228 and high pressure inlet port 224 may be assembled to high pressure gas distributor conduit 226 by brazing or welding, and high pressure gas distributor 222 may be assembled to aspirator body 220 at or through the wall by brazing or welding. High pressure gas distributor conduit 226 serves as a manifold for high pressure gas flowing to and discharged from the nozzle array 228. Thus, the fabrication of the high pressure gas distributor conduit 226 and the attachment of the high pressure gas distributor conduit 226 to aspirator body 220 require a number of steps that includes not only intricate machining, but also high temperature processing, all of which contributes to the high cost of the aspirator. FIG. 4 is another view of the aspirator viewed parallel to the longitudinal axis of aspirator body 220, clearly showing high pressure gas distributor 222 with its centerline coincident with the longitudinal axis of aspirator body 220, and nozzle array 228 extending parallel to the longitudinal axis of aspirator body 220. The position of the high pressure gas distributor conduit 226 along the centerline of aspirator body 220 interferes with flow of atmospheric air drawn into aspirator 210 from aspiration port 214.

What is needed is an aspirator that is simpler to fabricate. Simplicity in manufacturing ideally should lead to a concomitant reduction in cost. The aspirator should also desirably provide laminar flow of both high pressure gas and atmospheric air, providing for a more efficient aspirator.

SUMMARY OF THE INVENTION

An aspirator having a plurality of nozzles that are positioned along the aspirator body is disclosed. The aspirator body includes a high pressure integral conduit in communication with a nozzle array. The nozzle array also is integral with the aspirator body. Each nozzle of the nozzle array forms an acute angle with an inner diameter of the aspirator body terminating with a nozzle orifice extending toward an aspirator body centerline in a direction from an aspiration port, which aspirates air at atmospheric pressure, toward an exhaust port. A high pressure inlet port is in communication with the high pressure integral conduit and a source of high pressure gas. The high pressure inlet port also is integral with the aspirator body. The high pressure inlet port extends at an angle toward the longitudinal centerline of the aspirator body, the angle of the high pressure inlet port being preferably perpendicular to the longitudinal centerline of the aspirator body. The high pressure inlet port may be offset from the longitudinal centerline to allow the high pressure inlet port to have a lesser extension from the aspirator body. The source of high pressure gas may be input into the high pressure inlet port by a high pressure gas feed, typically a fitting which is threaded onto the high pressure inlet port outside the aspirator body.

The aspirator may be fabricated by additive manufacturing, more commonly known as 3-D printing. As used herein, the term "additive manufacturing" may be used interchangeably with "3-D printing." The aspirator may be made from any material that can be printed using the 3-D printing process. The aspirator is printed layer by layer until the entire structure is formed. The aspirator does not have to comprise a monolithic material, as various materials can be used in each layer, or for each feature of the aspirator, as long as materials in adjacent layers are compatible.

An advantage of the present invention is that the aspirator can be fabricated inexpensively by 3-D printing. Expensive machining of complex parts can be eliminated. Because all of the features of the aspirator can be made integral as part of the printing process, high temperature assembly of the individual parts can be eliminated.

Another advantage of the present invention is that 3-D printing of the aspirator permits features to be formed in the aspirator that would be very difficult, if not impossible, to assemble using the prior art machining and brazing or welding techniques currently used to fabricate aspirators.

Still another advantage of the present invention is that the features that may be formed in the aspirator that could not otherwise be fabricated into current aspirators in a cost-effective manner, if at all, improve laminar flow of both high pressure gas and aspirated air through the aspirator.

Another advantage of the present invention, a corollary advantage to the improved laminar flow of gases through the aspirator, is that for a preselected volume of high pressure gas at a preselected pressure, an inflatable device of a preselected size may be filled more quickly with an aspirator of the present invention than with a prior art aspirator. Alternatively, an inflatable device of a preselected size may be filled as quickly with an aspirator of the present invention as a prior art aspirator, but the aspirator of the present invention will require less high pressure gas. Thus, the present invention will allow inflation of an inflatable device with less required high pressure gas or in the alternative, will inflate an inflatable device more quickly with the same volume of high pressure gas.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 7(a) is a view of the 3-D printed aspirator showing the aspirated air entrance and seal mechanism. FIG. 7(b) is a top view of the 3-D printed aspirator depicting the high pressure inlet fitting/port and also showing an overall profile of the aspirator when viewed from above the high pressure inlet fitting/port.

FIG. 8(a) is a view of the prior art aspirator from the aspiration port, while

DETAILED DESCRIPTION OF THE INVENTION

Figure 1:
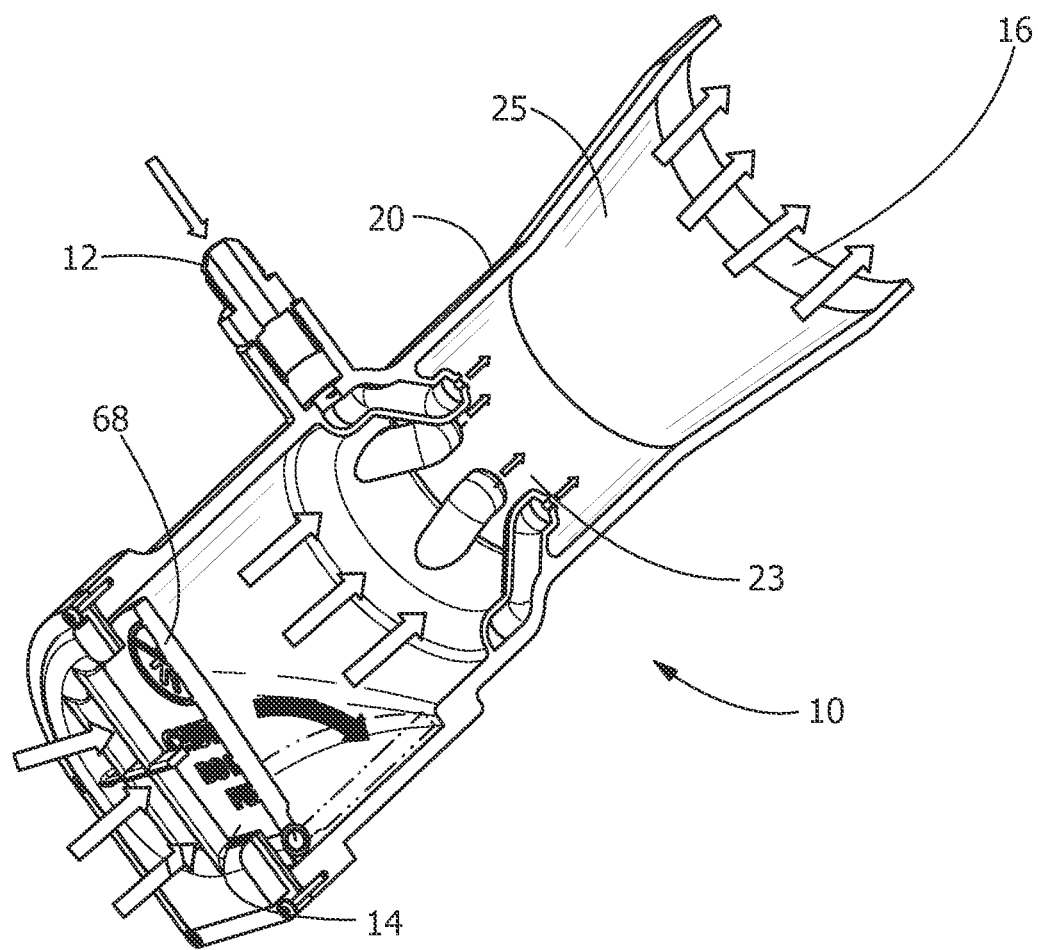
FIG. 1 is a view of an aspirator, illustrating the general principles of aspirator operation.

An aspirator fabricated in accordance with additive manufacturing techniques such as 3-D printing technology is set forth. The aspirator 10 generally functions as depicted in FIG. 1. The aspirator comprises an exhaust port 16 coupled to an aspirator body 20 and has a longitudinal centerline extending from a first end to a second end. High pressure compressed gas is injected into aspirator 10 through a high pressure inlet fitting 12. The high pressure gas moves through a convergent portion 23 of the aspirator 10 where the velocity of the high pressure gas increases. The velocity increase is accompanied by a pressure decrease. As a result of the pressure decrease, air at atmospheric pressure is drawn into aspirator through aspiration port 14 which is open to the atmosphere. As the gas and air mix and the mixture passes through the optional divergent portion 25, the velocity of the fluid decreases and the pressure increases as it is discharged through exhaust port 16 which is positioned within an inflatable device, thereby inflating it. In a preferred embodiment, the aspirator may include a divergent portion 25; however a divergent portion as a feature of aspirator 10 is not necessary for proper operation of the present invention. The convergent portion 23 may be positioned within the aspirator body 10 and fabricated as an integral part of the aspirator body 20, as shown in FIG. 1, or convergent portion 23 may be positioned within exhaust port 16 which may be fabricated as an integral part of aspirator 10 or as a separate part. Thus, the invention is not restricted by the location of the convergent portion 23 within aspirator 10.

Figure 2:
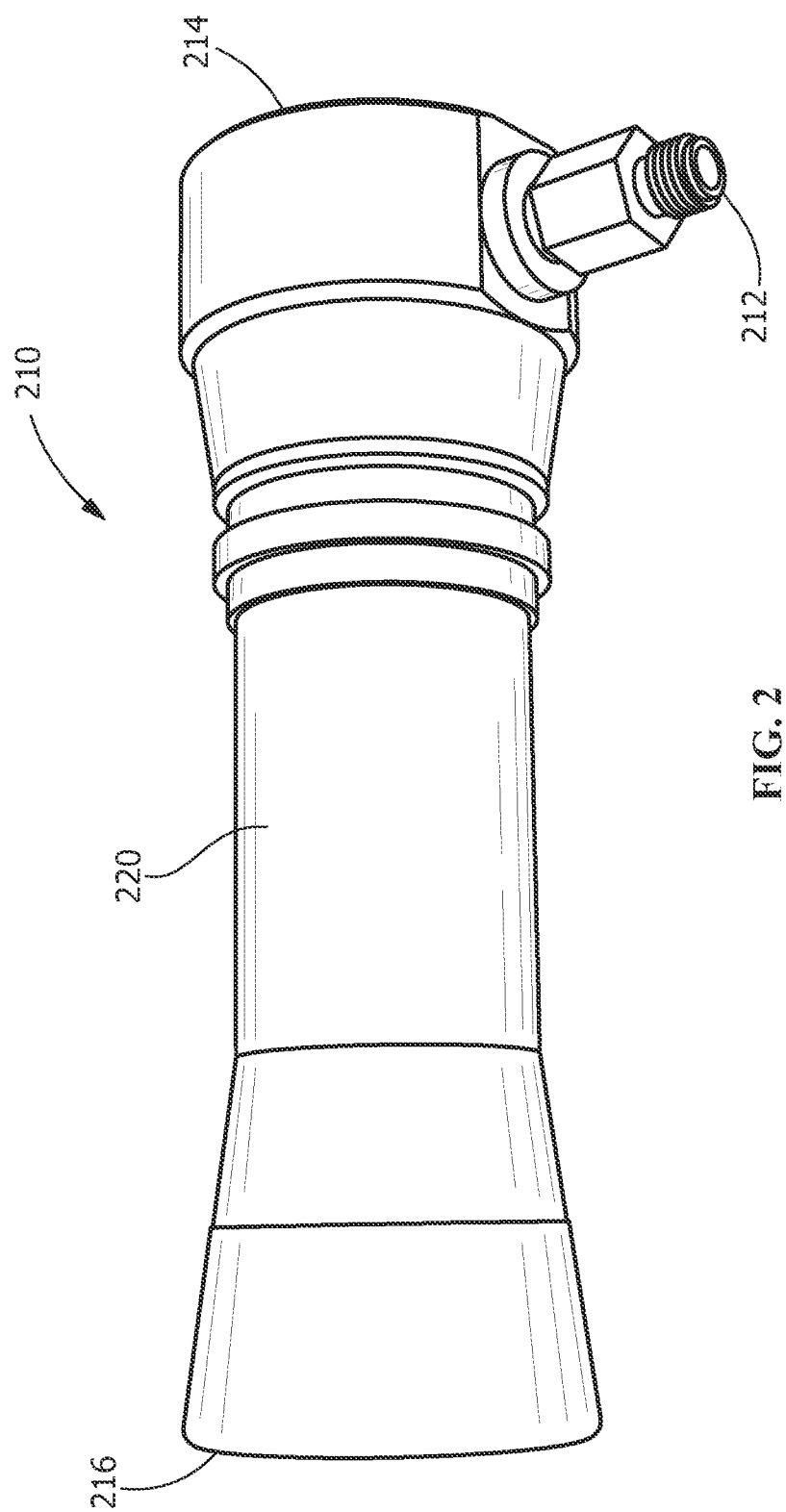
FIG. 2 is a side view of a prior art aspirator.
Figure 3:
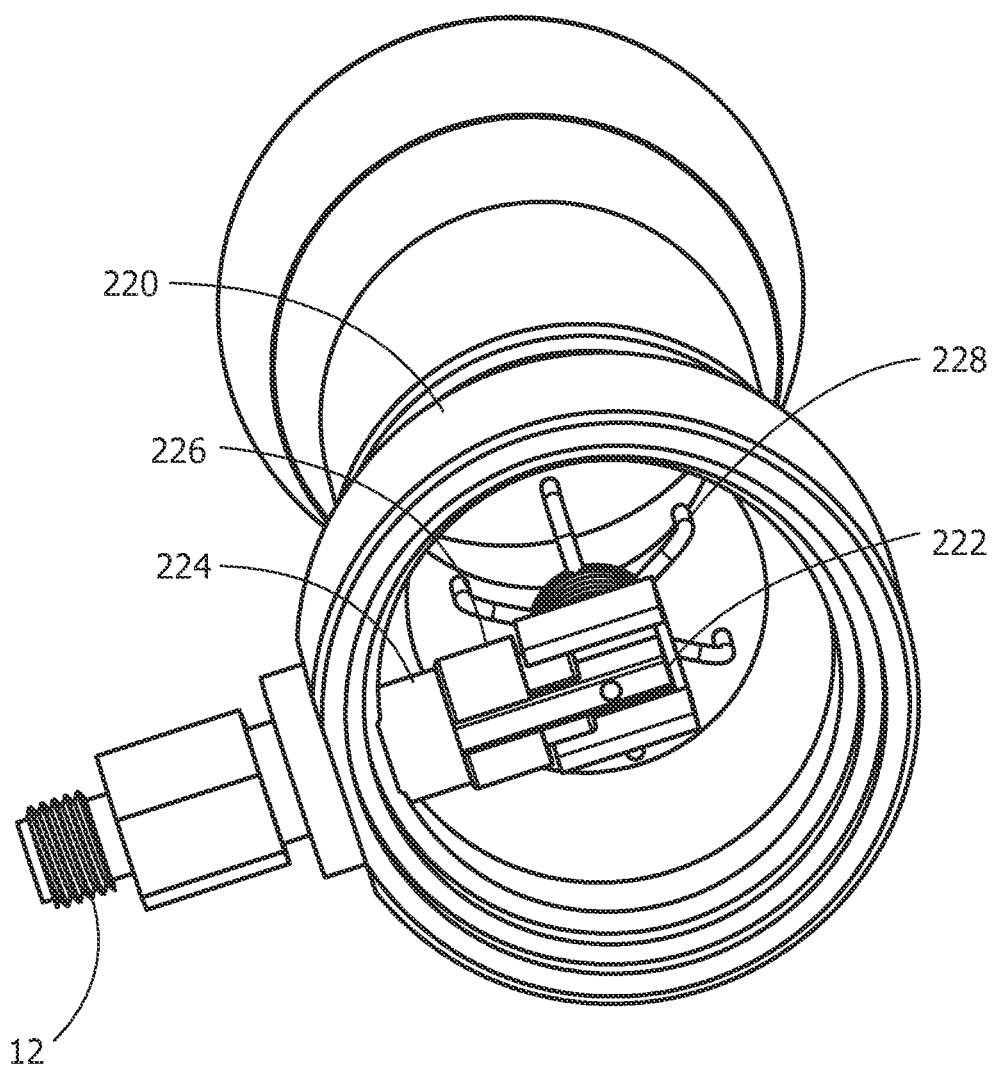
FIG. 3 is a view of the prior art aspirator from the aspiration port of the aspirator along the longitudinal centerline.
Figure 4:
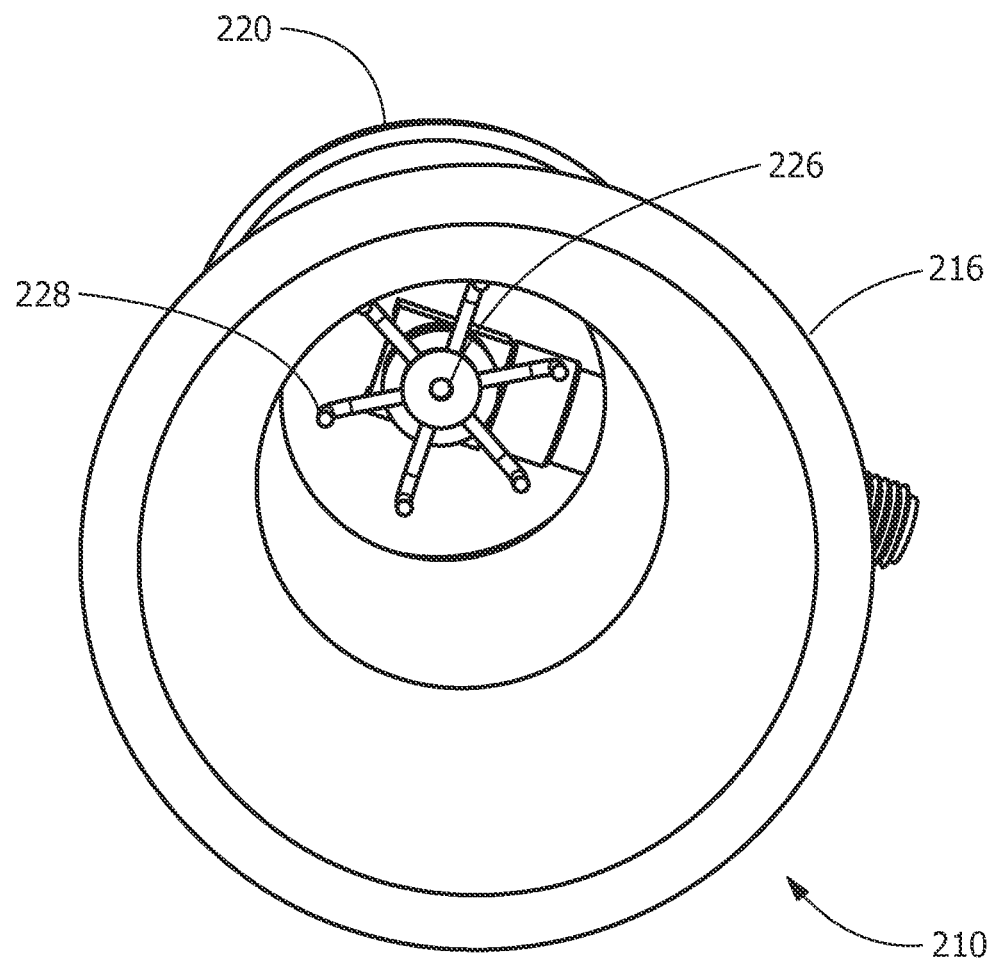
FIG. 4 is a view of the prior art aspirator from the exhaust port of the aspirator along the longitudinal centerline.
Figure 5:
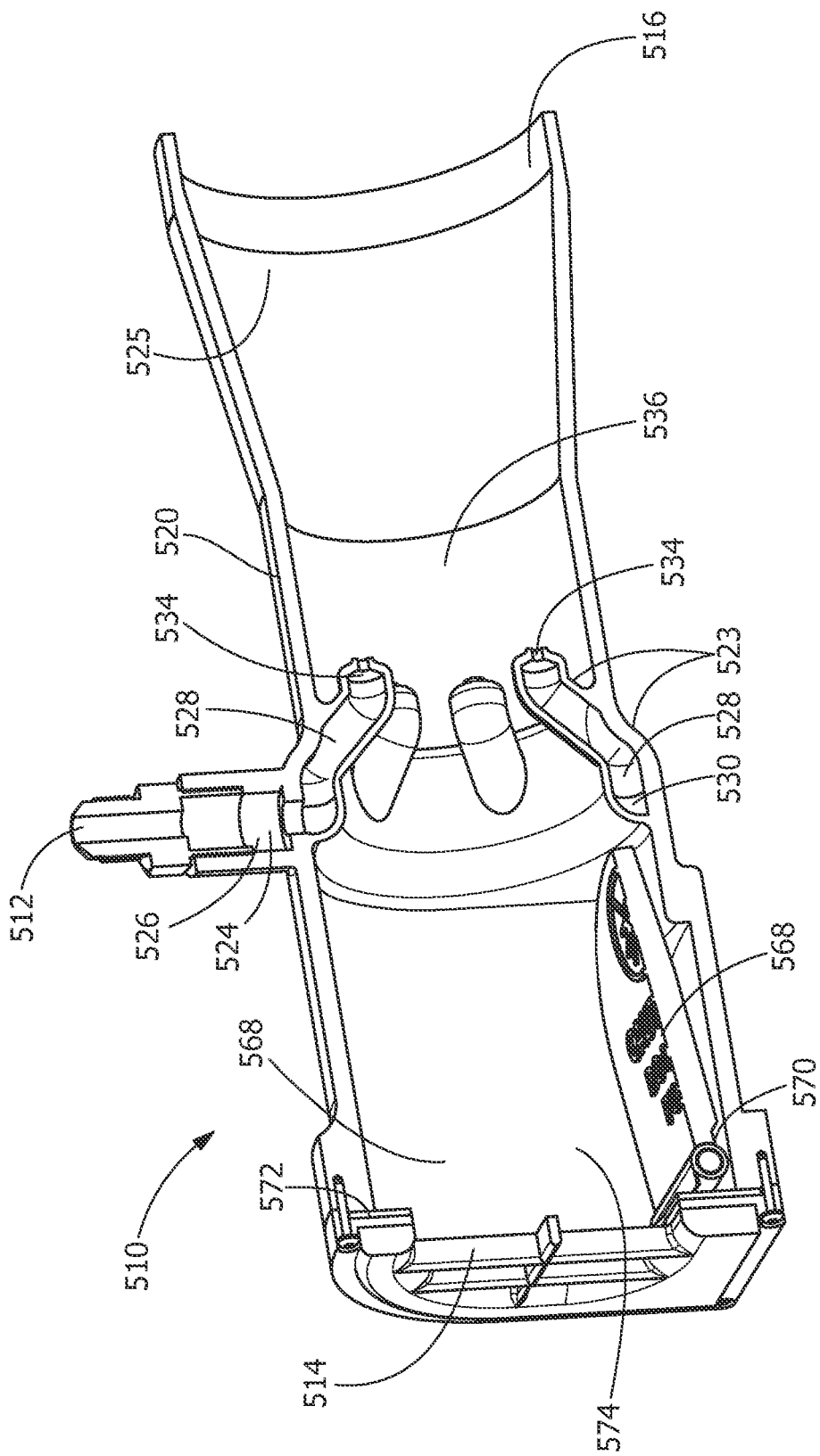
FIG. 5 depicts a partial cutaway view of the aspirator of the present invention.

The aspirator 10 set forth herein differs in several aspects from prior art aspirators such as aspirator 210 depicted in FIGS. 2-4. FIG. 5 depicts a partial cutaway view of aspirator 510 of the present invention. Like aspirator 210, aspirator 510 includes a high pressure inlet fitting 512, an aspirator body 520 having an aspiration port 514 at a first end, an exhaust port 516 secured to the aspirator body, a convergent portion 523 and an optional divergent portion 525 between a first end and a second end of aspirator 510. A check valve having a check valve gate 568 is positioned to articulate at the aspiration port end of aspirator 510 from a first position blocking air flow into the aspirator through aspiration port 514 to a second position in which air flows into the aspirator, and in particular, so that air flow is unobstructed along a centerline of aspirator 510. When the pressure within aspirator 510 equals ambient pressure, check valve gate 568 is urged by spring 570 against seal 572 to preclude leakage of fluid outward through aspiration port 514. The spring constant of spring 570 is such that when the pressure within the aspirator body becomes negative, such as when pressurized gas is input through high pressure inlet fitting 512, the check valve opens as check valve gate 568 pivots away from aspiration port 514 and air is aspirated through aspiration port 514. However, when the gas pressure becomes equal to or higher than atmospheric pressure, such as when the device attached to aspirator 510 is fully inflated, or the gas in the gas supply becomes depleted so that there is no longer a negative pressure within aspirator 510, spring 570 articulates check valve gate 568 to a closed position, the air pressure downstream of aspiration port 514 being insufficient to overcome the spring force which urges check valve gate 568 against seal 572 to prevent leakage from the inflatable device through aspirator 510. Also visible in FIG.

5 is a recess 574 formed along the inner diameter of aspirator body 520 that accommodates flapper or check valve gate 568 as it pivots within aspirator body 520 away from seal 572 or into engagement with seal 572.

Unlike aspirator 210, aspirator 510 is of single piece construction. Aspirator 510 includes a high pressure integral conduit 530 fabricated integrally into aspirator body 520. As used herein, the term integral or fabricated integrally means that the feature is fabricated into the aspirator body as the aspirator body 520 is formed, and does not require a separate processing step such as welding or brazing to attach the feature to aspirator body 520. High pressure integral conduit 530 is in communication with a high pressure gas source, typically through a high pressure inlet fitting 512 attached to high pressure inlet port 524. High pressure inlet fitting 512 may be a separate piece that is not integral to the aspirator, but, when a separate piece, is attached usually by a threaded connection. High pressure inlet port 524 is also formed integrally with aspirator 510 extending from the exterior of aspirator body 520 into high pressure integral conduit 530 and providing fluid communication for high pressure gas from the high pressure gas source into high pressure integral conduit 530. A nozzle array 528 is in fluid communication with high pressure integral conduit 530. There are a plurality of nozzles in nozzle array 528, each nozzle 532 being arcuate in shape and integral with aspirator body 520, extending from aspirator body 520 in the region of high pressure integral conduit 530. Each nozzle 532 of nozzle array 528 includes a nozzle orifice 534 through which high pressure gas from high pressure integral conduit 530 is discharged in the direction of exhaust port 516.

Each nozzle 532 within nozzle array 528 extends away from aspirator body inner diameter 536 at a shallow or acute angle. Importantly, however, each of the plurality of nozzle orifices 534 is arranged so that they discharge high pressure gas from the high pressure integral conduit 530 parallel or substantially parallel to the centerline of the longitudinal axis of aspirator 510, but not coincident to the longitudinal axis of aspirator 510. Substantially parallel includes narrow angles or angles that are acute and away from with regard to the longitudinal axis of the aspirator body. None of nozzles 532 of nozzle array 528 crosses the longitudinal centerline of aspirator 510, as is evident from FIG. 8(b), so that the volume of the aspirator at and near the aspirator centerline is unobstructed along its length from its first end to its second end when check valve gate 568 is articulated to a second position adjacent to recess 574. Preferably nozzle orifices 534 are arranged in a circle having a predetermined radius from the longitudinal centerline. The predetermined radius defines a circle having a diameter that may vary from 10-80% of the aspirator body inner diameter 536, preferably 20-70% of the aspirator body inner diameter and most preferably 30-50% of the aspirator inner diameter at a preselected location of the aspirator body inner diameter. While any point along the aspirator body inner diameter may be selected, the preferred point for selecting the aspirator body inner diameter 536 to determine the predetermined radius of the circle defining the orifice circle is at the end of the convergent portion of the aspirator. The circle defining the orifice circle is positioned diametrally within the aspirator at a diameter no greater than where the convergent portion of the aspirator ceases to converge toward the longitudinal centerline and the diameter becomes constant or begins to enlarge (i.e. diverge). This maximum diameter results in minimal deflection, and preferably no deflection of pressurized gas along the aspirator inner diameter, minimizing or eliminating turbulence from gas deflection along aspirator walls. However, nozzle orifices 534 may be arranged along the inside diameter 536 of the aspirator body 520 at more than one radius, provided that none of the gas injectors cross the longitudinal centerline of aspirator body 520, obstructing free flow of fluid along the aspirator centerline, and have nozzle orifices 534 arranged to discharge high pressure gas parallel to or substantially parallel to the longitudinal centerline of aspirator body 520.

High pressure inlet port 524 may be threaded at the end opposite aspirator body so as to accept a fitting 12, 512 such as shown in FIGS. 1 and 5 respectively. High pressure inlet port 524 may be threaded by any convenient means to accept such a fitting. Thus threading of high pressure inlet port 524 providing it with external threads or internal threads may be an operation performed after completion of additive manufacturing of aspirator 510. Alternatively, the additive manufacturing operation may be programmed so as to form external threads or internal threads of the proper pitch and length. In FIGS. 1, 2 and 5, high pressure inlet fittings 12, 212, 512 respectively as depicted include external threads that are threaded onto internal threads formed in high pressure inlet port 524. Any other attachment arrangement may be used. While the system has been described as having one gas inlet, the system may have a plurality of inlet ports 524 each in fluid communication with a plurality of high pressure gas sources. While the system has been described as having a single nozzle array, the system may have a plurality of nozzle arrays, each nozzle array in fluid communication with one or more high pressure gas sources through one or more inlet ports. When a plurality of nozzle arrays is included, the plurality of nozzle arrays preferably are arranged to minimize turbulence within aspirator 510.

In operation, high pressure gas from a pressurized gas source (not shown) is delivered to high pressure integral conduit 530 through high pressure inlet fitting 512 and high pressure inlet port 524. The high pressure gas is uniformly distributed through high pressure integral conduit 530 into each of the nozzles 532 of nozzle array 528 and expelled through nozzle orifices 534 into the aspirator interior. The high pressure gas is expelled from the nozzle orifices 534 in the direction of convergent portion 523 of aspirator 510 and parallel to or substantially parallel to the centerline of aspirator body 520. Because none of the nozzles 532 in nozzle array 528 cross the aspirator body centerline and none of the nozzle orifices 534 discharges high pressure gas toward the aspirator body centerline, there is a region around the centerline which develops low pressure as the high pressure gas speed increases as it traverses convergent portion of aspirator 510. The low pressure causes check valve gate 568 to articulate from a first closed position to a second open position. Air at atmospheric pressure from aspiration port 514 is now drawn in a laminar fashion into this low pressure region. This differs from the prior art, as high pressure gas distributor conduit 226 occupies a position along aspirator body centerline as shown in FIGS. 3 and 4, creating a turbulent flow within aspirator body 220. Laminar flow is preferred to turbulent flow as laminar flow is smoother, providing a more predictable flow of gas through aspirator body 520 with less loss of energy, making aspirator 510 more efficient than prior art aspirator 210.

In applications which require aspirator 510 to maintain pressure after use, an inlet check valve 526 within high pressure inlet port 524 may be utilized. Check valve 526 prevents back pressure from entering the high pressure source via high pressure inlet port 524. In applications where a detachable high pressure source may be used, the inlet check valve 526 will prevent the inflatable device activated by aspirator 510 from deflating through aspirator inlet fitting 512.

Figure 6:
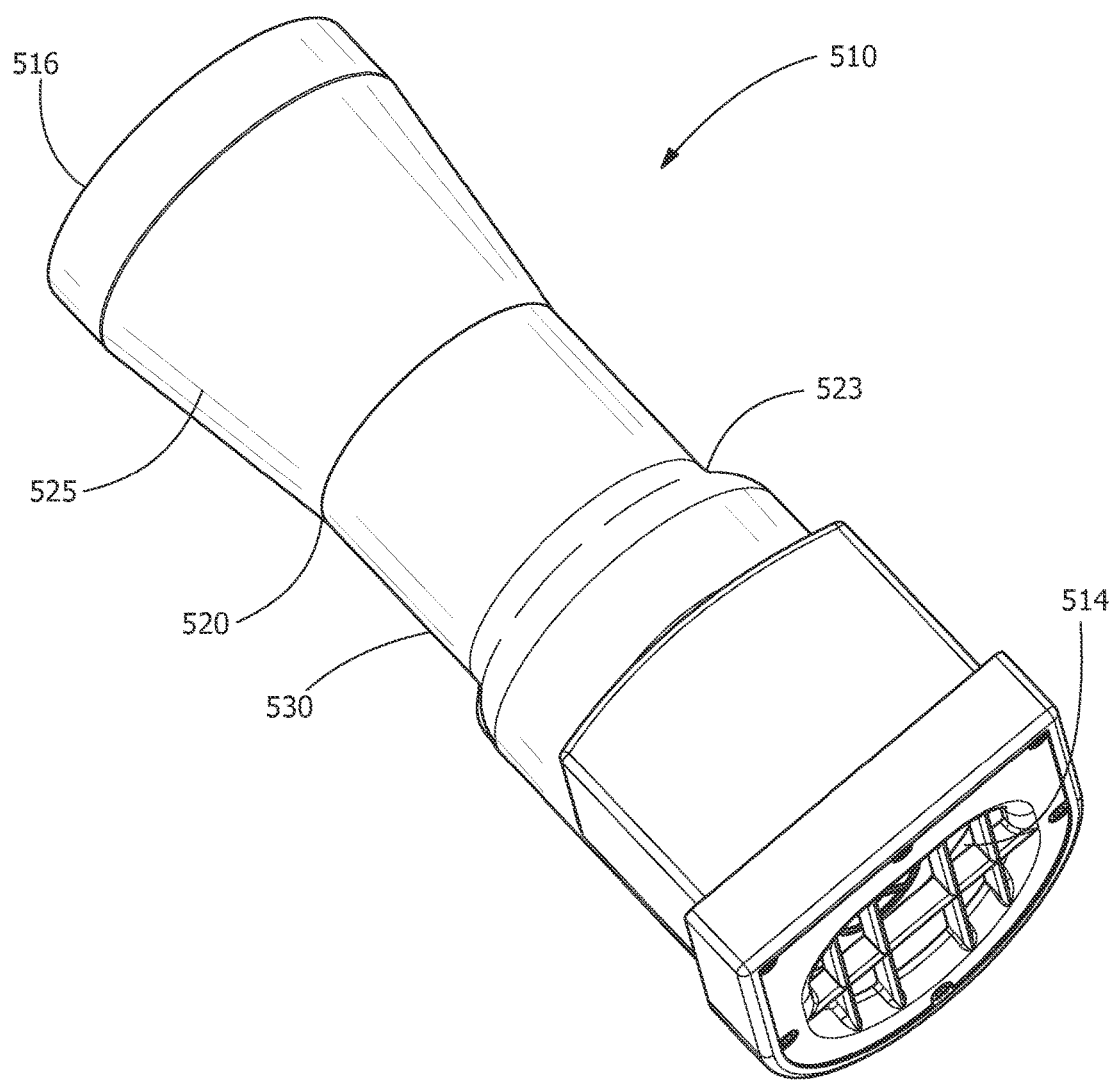
FIG. 6 is a bottom view of an aspirator of the present invention manufactured using a 3-D printing process.

FIGS. 6 and 7 depict an aspirator such as shown in FIG. 5 fabricated by 3-D printing. The 3-D printing process makes possible fabrication of a cost effective, single piece aspirator having integral features, including integral features such as a high pressure inlet port 524, a high pressure conduit 530, and nozzles 532 with nozzle orifices 534. This complex aspirator cannot be fabricated as a single piece by conventional manufacturing techniques such as die casting or injection molding. Current manufacture requires several different manufacturing steps, which impose limits on available geometric configurations. 3-D printing of aspirator 510 makes possible the extensive use of internal passages used to form high pressure integral conduit 530 within aspirator body 520 and nozzles 532 of nozzle array 528 extending away from the inner diameter 536 of aspirator body 520.

In addition to the internal geometries being only possible using this manufacturing method, 3-D printing lends itself to allow for a variety of exhaust port 516 configurations impossible to manufacture using traditional methods. Exhaust port 516 configurations within the present inventive concept include, but are not limited to two or more outlet exhaust port splits, angled elbows, complex-shaped bends, reducers and combinations thereof. Configurations of exhaust port 516 may also be manufactured as a separate component when aspirator 510 comprises separate components of an aspirator body 520 secured to exhaust port 516. Exhaust port 516 may be manufactured separately by additive manufacturing or by a different manufacturing technique and secured to aspirator body 520. In an embodiment in which the aspirator body and the exhaust port are manufactured as separate components, aspirator body 520 and exhaust port 516 may be joined together using an interlocking arrangement, such as interlocking flanges, a dovetail arrangement or other interlocking configuration. The interlocking arrangement, however, is airtight, that is, the interlocking arrangement does not allow leakage of fluid across an interlocking joint. Thus the interlocking arrangement may further include a seal ring or gasket between the interfacing surfaces of the aspirator body 520 and exhaust port 516. Furthermore, the aspirator body 520 may be removably joined to the exhaust port 516 or may be permanently joined to the exhaust port 516 in an airtight arrangement. A permanent joint may be accomplished using a permanent glue or adhesive, or by welding or brazing. The type of permanent joint will depend upon the material comprising both the exhaust port 516 and aspirator body 520. A removable joint will usually be a mechanical joint, such as flanges or dovetails, with or without seals or gaskets, as discussed above.

The 3-D printing may use one of several disciplines, including but not limited to fused filament fabrication (FFF) or selective laser sintering (SLS). FFF utilizes a movable deposition nozzle controlled by a programmable controller, a computer or equivalent device, which precisely applies material of substantially uniform size in layers while melting the material. Immediately after deposition, the material resolidifies. The material is repeatedly deposited over prior layers, melted and solidified, typically in thicknesses of 0.004 inches (4 mils) or less per pass until the article, in this invention, the aspirator, either as a single unit or as the aspirator body and/or aspirator exhaust port, is completely formed. In SLS, a laser is controlled by a programmable controller, a computer or equivalent device, which sinters a precise layer of heat-sensitive powder to the desired shape Immediately after sintering, the melted powder re-solidifies. After each layer is sintered, a new layer of powder of substantially uniform thickness is applied over the previously-applied sintered layer, allowing each subsequent layer to be sintered using fresh or new material, creating the desired shape of aspirator 510 as shown in the Figures. For the aspirator of the present invention, the powder may be any material mechanically and chemically compatible with the aspirator application, such as a high grade powdered nylon having mechanical strength comparable to aluminum. Any other polymeric material may also be used. And the materials used for aspirators are not limited to polymers as metals and metallic alloys may also be used to form aspirators using either SLS or FFF processes.

The parameters for depositing and/or sintering the material and forming layers are well known to the art, although the geometry of the integral aspirator 510 of the present invention is novel. The aspirator as formed requires no additional machining with the possible exception of internal threading of the high pressure inlet port after it is formed to accept a fitting.

While the 3-D printing set forth above fabricates an integral aspirator comprising a monolithic material, such as high strength nylon, the construction of the aspirator is not so limited. If desired, the aspirator may be comprised of a different primary material of a plurality of materials, each deposited at different locations at different times. This may be done by providing different heads with different material feeds or a head with different deposition nozzles, different material feeds being provided to each nozzle. The different materials may be deposited in accordance with instructions programmed into the computer. Thus for example, prior art aspirator 210 includes an aluminum or aluminum alloy high pressure inlet port 224. Using the 3-D printing process for the current invention, a second material feed and deposition head can be provided for the deposition of a second material, aluminum or aluminum alloy filament on nylon aspirator 510. The programming of the 3-D printer can be provided to deposit aluminum or aluminum alloy material at the location of high pressure inlet port 524, thereby providing a multi-material aspirator, if desired or required. Further, the technology may permit the deposition of a metallic fitting at high pressure inlet fitting 512 over high pressure inlet port 524, eliminating the need to thread the conduit and attach a separate fitting, should that provide an economic advantage as an alternative. Although the method set forth herein indicates that the preferred material for the additive manufacture of the aspirator is nylon formed using a layer-by-layer deposition technique, the invention is not so limited. Thus, any other materials may be used to fabricate the aspirator of the present invention, depending on the engineering requirements for the aspirator which may allow materials with less strength or require materials of greater strength. Indeed, since 3D printing permits the use of multiple materials at different locations, regions requiring high strength may be fabricated from high strength materials, while adjacent regions having lower strength requirements, may be fabricated of lower strength material. The programming of the computer or programmed controller will deposit the correct material at the correct location of the aspirator. In addition, the fabrication is not restricted to 3-D printing, and any other fabrication technique that permits the deposition of material in the configuration of the aspirator may be used.

Because of the ability of the 3-D printing process to provide internal passage ways within the aspirator body, a multistage aspirator may be provided. A multistage aspirator includes nozzles positioned to inject pressurized gas at different locations along the longitudinal length of aspirator body 520. These nozzles can extend from the same high pressure integral conduit 530, but each set of nozzles injects pressurized gas at different longitudinal positions along the aspirator body. Preferably, a plurality of high pressure integral conduits 530 are fabricated into aspirator body 520. Each high pressure integral conduit of the plurality of high pressure integral conduits has a nozzle extending into the aspirator body interior. Preferably, a nozzle array 528 associated with each high pressure integral conduit 530 inject gas into aspirator body 520 along different diameters within the aspirator body as well as at different circumferential locations along these respective diameters so as to minimize turbulence within aspirator body 520. The integral high pressure conduits may be fluidly connected via internal passageways within aspirator body 520 so that each of the integral high pressure conduits is provided with gas from a single high pressure inlet fitting 512. Alternatively, each of the high pressure integral conduits 530 may be provided with their own high pressure inlet fitting 512 through a high pressure inlet port 524 dedicated to each high pressure integral conduit 530. The high pressure gas may be provided from a single high pressure gas source or a plurality of high pressure gas sources, which increases the vacuum draw.

Figure 8A:
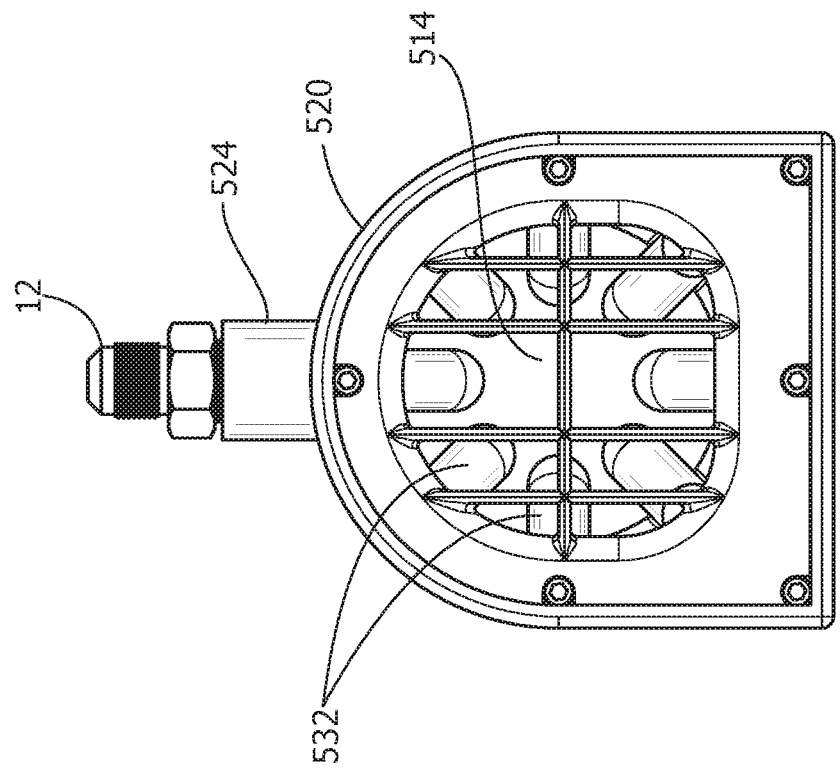
Figure 8B:
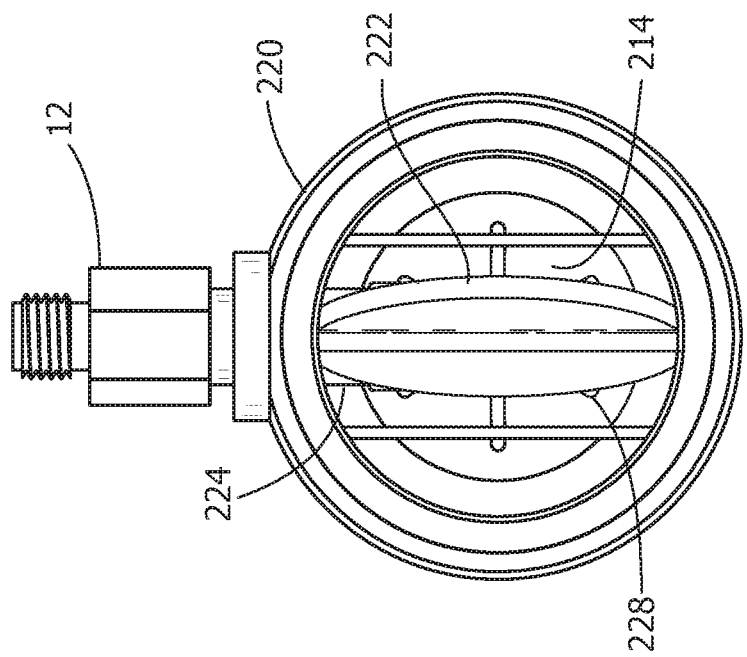
FIG. 8(b) is a view of the present invention looking down the centerline of the aspirator body from the aspiration port with the check valve gate opened.

The aspirator made by 3-D printing enables laminar flow of aspirated gas through a region defined by the longitudinal centerline of aspirator body 520. Turbulence arising from a high pressure integral conduit 530 located along the longitudinal centerline is eliminated by the relocation of the manifold to within the aspirator body. Further, turbulence caused by mixing with high pressure gas from the nozzle array extending into the aspirator body is also eliminated. The improved gas flow in aspirator 510 is evident from FIG. 8. FIG. 8(a) is a view of the prior art aspirator 210 from the aspiration port 214, with a check valve open. As can be seen, high pressure gas distributor conduit 226 and the nozzle array 228 obstruct air flow along the centerline of aspirator body 220. FIG. 8(b), a view of aspirator 510 of present invention looking down the centerline of the aspirator body 220 from the aspiration port 514 with the check valve opened, clearly illustrates the advantage of aspirator 510 over aspirator 210. In FIG. 8(b), it can be seen clearly that the region around the centerline of aspirator 510 is completely unobstructed, contributing to laminar flow of air drawn in through aspiration port 514 and through aspirator body 520. To further contribute to the unobstructed longitudinal centerline of aspirator body 520, the check valve gate 568 is attached to the aspirator body 520. As a result of the unobstructed centerline of aspirator 510, the velocity of the fluid entering the convergent portion 523 of convergent/divergent nozzle increases, which leads to a higher pressure within the divergent portion of convergent/divergent nozzle and higher pressure $P_2$ at exhaust port 516. This results in a higher compression ratio $P_2/P_1$, as $P_2$ is increased, $P_1$ being atmospheric pressure and remaining unchanged. Similarly, the entrainment ratio of the aspirator, $W_s/W_v$, also improves as the amount of the motive fluid, $W_s$, required to entrain and compress a given amount $W_v$ of suction fluid decreases, a lower entrainment ratio being preferable. Thus, in aspirator 510, less compressed gas $W_s$ is required to entrain the same amount of suction fluid $W_v$. Alternatively stated, the same amount of compressed gas $W_s$ can entrain more suction fluid $W_v$. As can be seen, aspirator 510 depicted in FIGS. 1 and 5-8 can be significantly more efficient than prior art aspirators 210 depicted in FIGS. 2-4. This can lead a number of design considerations. Not only can a smaller supply compressed gas be required for a particular application, but a smaller aspirator may also be utilized for a particular application. Alternatively, an inflatable device may be inflated faster with the aspirator of the present invention if the supply of compressed gas remains the same.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aspirator for an inflatable device having a first end, a second end and a straight longitudinal centerline extending from the first end to the second end, comprising:
   an aspirator body, the aspirator body having a single aspiration port aligned with the longitudinal centerline at the first end of the aspirator, the aspirator port providing all air aspirated through the aspirator body, the first end having a check valve;
   an exhaust port aligned with the longitudinal centerline at the second end of the aspirator coupled to the aspirator body, the second end adapted to discharge to the inflatable device;
   a high pressure conduit positioned within the aspirator body;
   each nozzle of a plurality of nozzles in fluid communication with the high pressure conduit extending from an inside diameter of the aspirator body into the interior of the aspirator body without limiting flow across the longitudinal centerline of the aspirator with the conduit, each of the plurality of nozzles having an orifice directed parallel or substantially parallel to the longitudinal centerline of the aspirator, a high pressure gas discharged from each orifice being discharged parallel or substantially parallel to the longitudinal centerline of the aspirator, each of the plurality of nozzles only receiving the high pressure gas from the high pressure conduit;
   a high pressure inlet port extending across a wall of the aspirator body, the port providing fluid communication between the high pressure conduit and a high pressure gas feed from a source of high pressure gas;
   wherein the gas discharged from each of the orifices parallel to or substantially parallel to the longitudinal centerline provides unobstructed aspiration of air flow along the longitudinal centerline of the aspirator from the first end of the aspirator body through the exhaust port; and
   wherein the aspirator body is a single piece composed of a monolithic material.

2. The aspirator of claim 1, wherein the check valve is an articulating check valve gate movable from a first position blocking air flow into the aspirator body to a second position in which air flow along the longitudinal centerline is unobstructed by the gate.

3. The aspirator of claim 1, wherein the check valve is an articulating check valve gate at the aspiration port end of the aspirator, articulating from a first closed position to a second open position wherein fluid flow is unobstructed along the longitudinal centerline of the aspirator when the gate is in the second open position.

4. The aspirator of claim 3 wherein the articulating check valve gate further includes a spring and a seal, the spring articulating the gate into the first position against the seal when no high pressure gas is discharged from the plurality of nozzles.

5. The aspirator of claim 1 further including a convergent portion within the aspirator and positioned between the first end and the second end.

6. The aspirator of claim 5 wherein the convergent portion is positioned in the aspirator body between the first end and the exhaust port.

7. The aspirator of claim 5 wherein the convergent portion is positioned in the exhaust port.

8. The aspirator of claim 5 further including a divergent portion within the aspirator positioned between the convergent portion and the second end.

9. The aspirator of claim 1 further including an inlet check valve at or within the high pressure inlet port, the inlet check valve preventing back pressure fluid flow from the nozzles through the inlet port.

10. The aspirator of claim 1 further including a fitting threaded onto the high pressure inlet port.

11. A method for making an aspirator using additive manufacturing, comprising the steps of:
providing a programmable device controlling a movable nozzle;
depositing a layer of material of substantially uniform size to a thickness of 4 mils or less by melting and resolidifying the material;
repeating the step of depositing, melting and resolidifying the material;
forming an aspirator by repeating the steps of depositing melting and resolidifying the material, the aspirator characterized by
an aspirator body, the aspirator body having a single aspiration port aligned with the longitudinal centerline at the first end of the aspirator, the aspirator port providing all air aspirated through the aspirator body, the first end having a check valve;
an exhaust port aligned with the longitudinal centerline at the second end of the aspirator coupled to the aspirator body, the second end adapted to discharge to the inflatable device;
a high pressure conduit positioned within the aspirator body;
each nozzle of a plurality of nozzles in fluid communication with the high pressure conduit extending from an inside diameter of the aspirator body into the interior of the aspirator body without limiting flow across the longitudinal centerline of the aspirator with the conduit, each of the plurality of nozzles having an orifice directed parallel or substantially parallel to the longitudinal centerline of the aspirator, a high pressure gas discharged from each orifice being discharged parallel or substantially parallel to the longitudinal centerline of the aspirator, each of the plurality of nozzles only receiving the high pressure gas from the high pressure conduit;
a high pressure inlet port extending across a wall of the aspirator body, the port providing fluid communication between the high pressure conduit and a high pressure gas feed from a source of high pressure gas;
wherein the gas discharged from each of the orifices parallel to or substantially parallel to the longitudinal centerline provides unobstructed aspiration of air flow along the longitudinal centerline of the aspirator from the first end of the aspirator body through the exhaust port; and
wherein the aspirator body is a single piece composed of a monolithic material.

12. The method of claim 11 further including an exhaust port formed integral with the aspirator body.

13. The method of claim 11 wherein the exhaust port is formed separately from the aspirator body and secured to the aspirator body in a fluid-tight arrangement.

14. The method of claim 13 wherein the exhaust port and the aspirator body include interlocking surfaces, and the exhaust port and the aspirator body are secured along the interlocking surfaces.

15. The method of claim 13 further including a seal between the aspirator body and the exhaust port.

16. The method of claim 13 wherein the exhaust port is permanently secured to the aspirator body using a permanent joining method selected from the group consisting of welding, brazing and adhesive joining.

17. The method of claim 13 wherein the exhaust port is removably secured to the aspirator body.

18. The method of claim 11 wherein the high pressure inlet port is threaded.

19. The method of claim 12 wherein one of the aspirator body and the exhaust port includes a converging nozzle.

20. The method of claim 12 wherein the exhaust port further includes at least one of splits, angled elbows, complex-shaped bends and reducers.

21. The method of claim 11 wherein the additive manufacturing method is 3-D printing.

22. The method of claim 11 wherein the additive manufacturing method is fused filament fabrication (FFF).

23. The method of claim 11 wherein the additive manufacturing method is selective laser sintering (SLS).

* * * * *